No. 876,335.   
PATENTED JAN. 14, 1908.
J. H. COUPER & W. L. ALBRIGHT.  
KITCHEN CABINET.  
APPLICATION FILED DEC. 18, 1906.
2 SHEETS—SHEET 1.
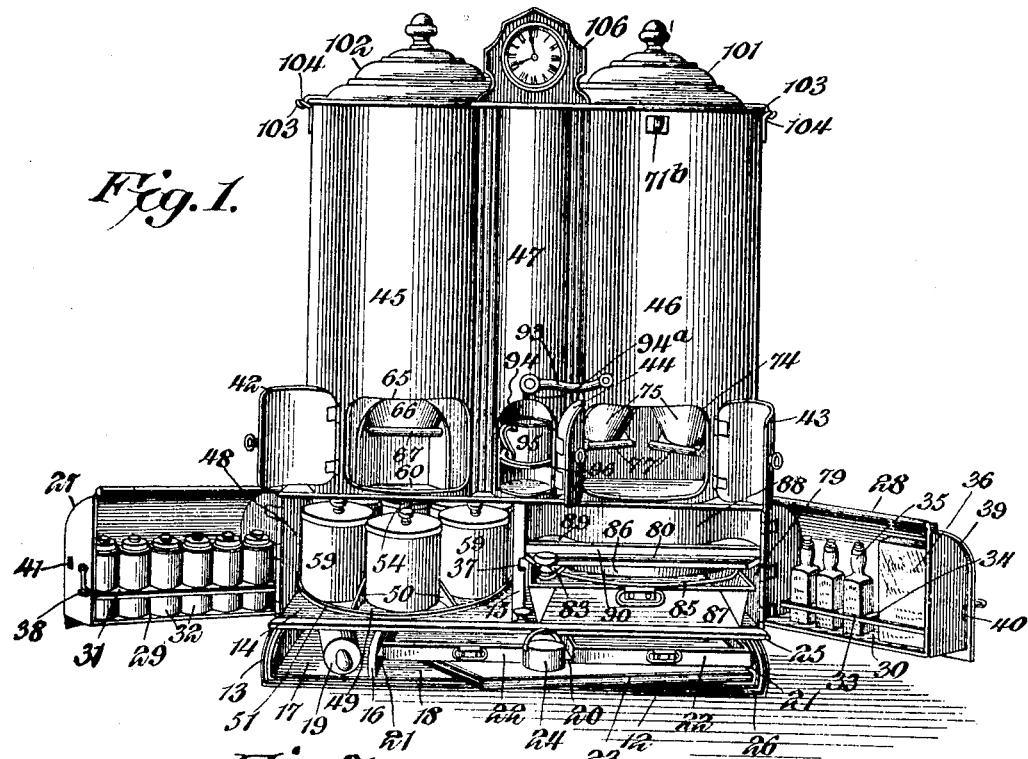
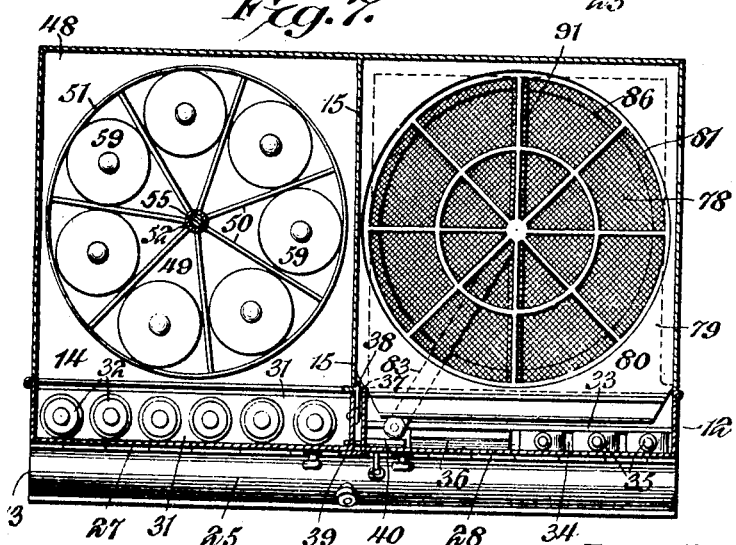
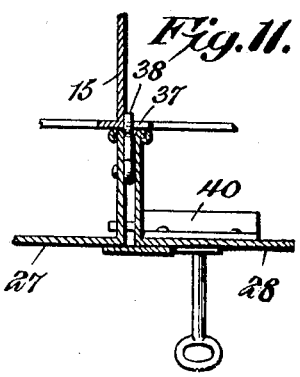
James H. Couper  
and William L. Albright, Inventors,
Witnesses  
Howard D. Orr.  
By E. G. Siggers  
Attorney

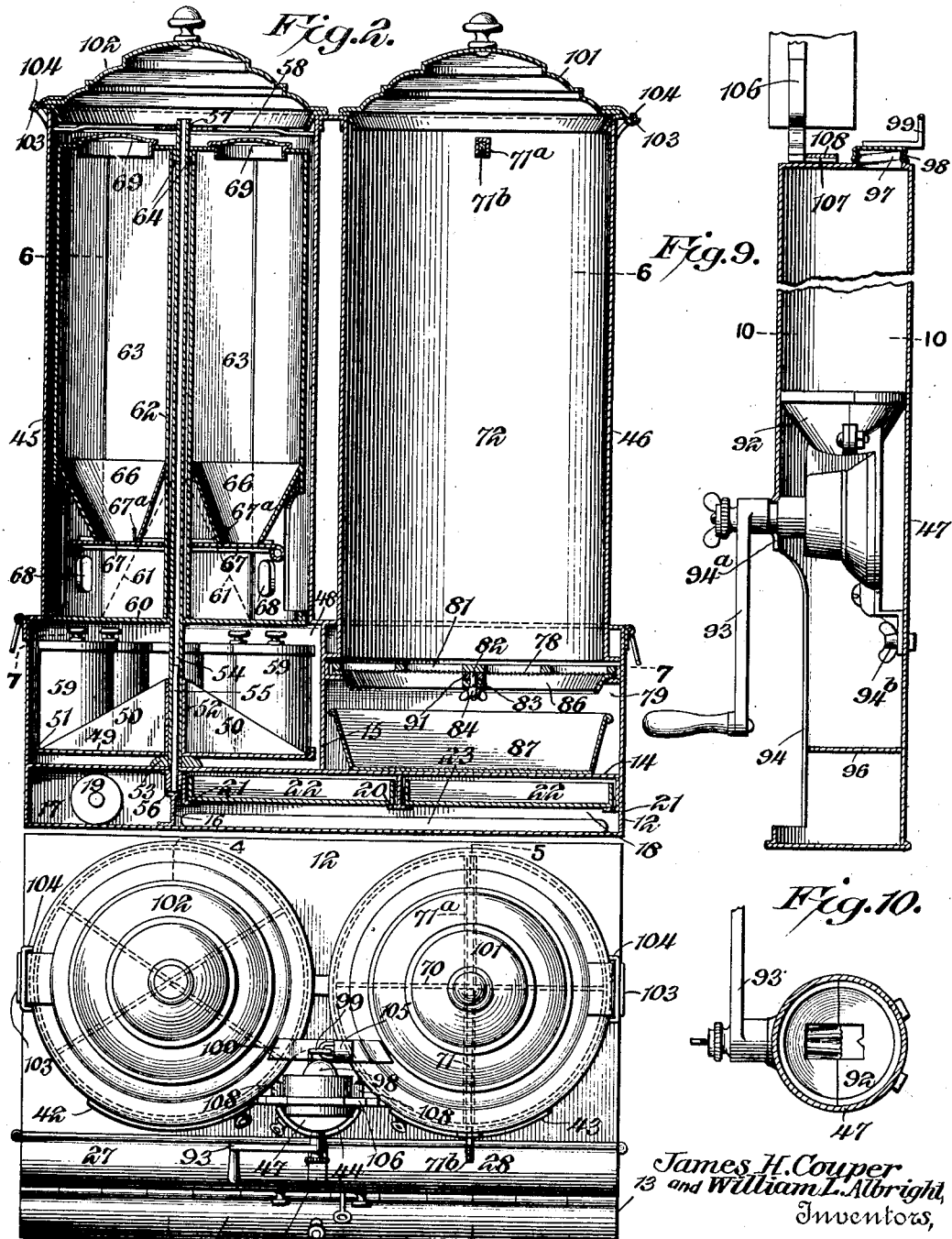

No. 876,335. PATENTED JAN. 14, 1908.
J. H. COUPER & W. L. ALBRIGHT.
KITCHEN CABINET.
APPLICATION FILED DEC. 18, 1906.
3 SHEETS—SHEET 3.
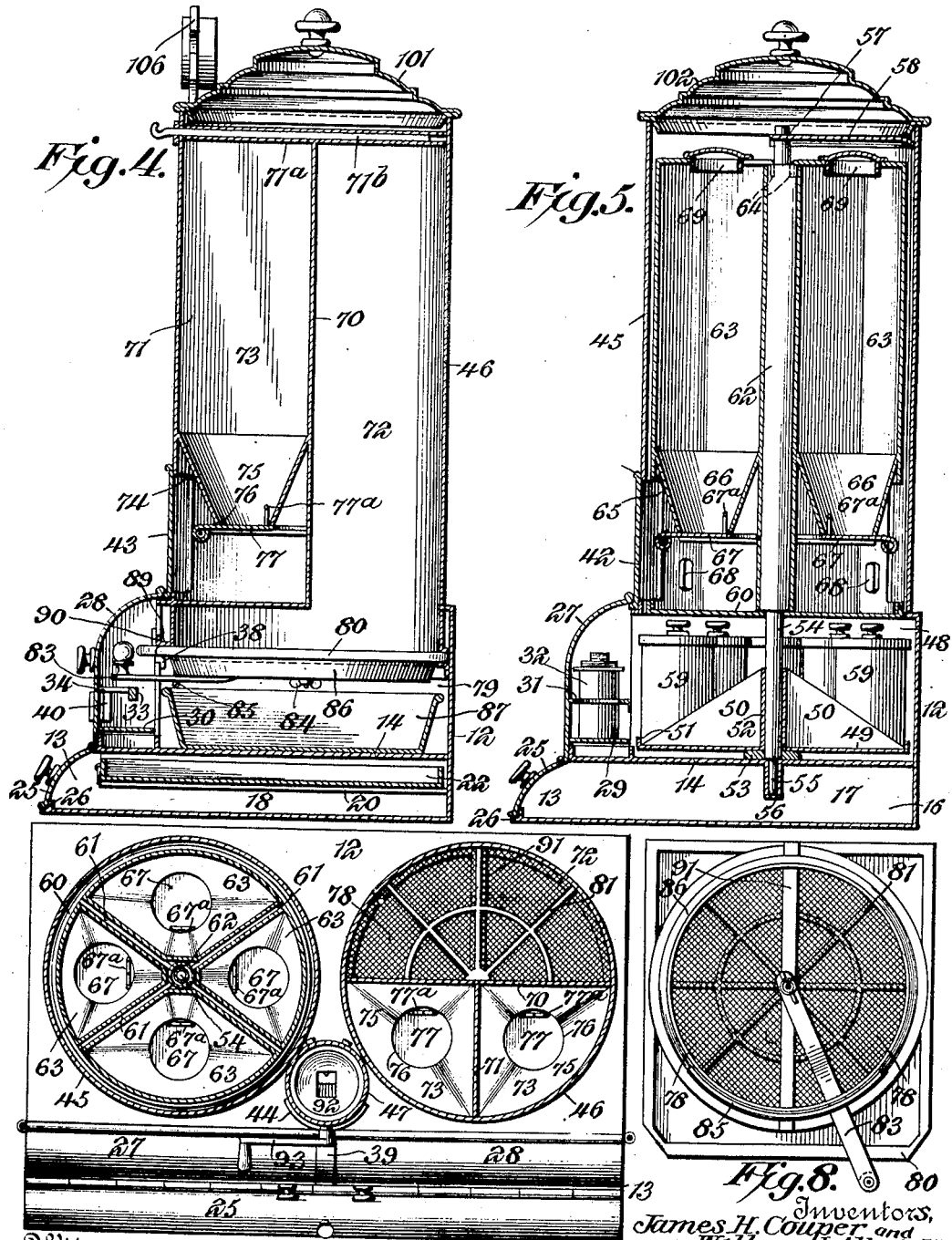

UNITED STATES PATENT OFFICE.

JAMES H. COUPER, OF ATLANTA, GEORGIA, AND WILLIAM L. ALBRIGHT, OF CINCINNATI, OHIO; SAID COUPER ASSIGNOR TO SAID ALBRIGHT.

KITCHEN-CABINET.

No. 876,335.

Specification of Letters Patent.

Patented Jan. 14, 1908.

Application filed December 18, 1906. Serial No. 348,464.

*To all whom it may concern:*

Be it known that we, JAMES H. COUPER and WILLIAM L. ALBRIGHT, citizens of the United States, residing at Atlanta and Cincinnati, respectively, in the counties of Fulton and Hamilton, respectively, and States of Georgia and Ohio, respectively, have invented a new and useful Kitchen-Cabinet, of which the following is a specification.

The invention relates to improvements in kitchen cabinets.

The object of the present invention is to improve the construction of kitchen cabinets, and to provide a simple and comparatively inexpensive cabinet, capable of compactly storing and rendering conveniently accessible materials used for culinary purposes, and adapted to protect such materials from inroads of animal pests and the deleterious effects of climatic changes.

A further object of the invention is to enable the various bins and compartments to be securely locked in a very simple manner, when desired.

With these and other objects in view, the invention consists in the construction and novel combination of parts hereinafter fully described, illustrated in the accompanying drawings, and pointed out in the claims hereto appended.

In the drawings:—Figure 1 is a perspective view of a kitchen cabinet, constructed in accordance with this invention. Fig. 2 is a central vertical view, taken longitudinally of the kitchen cabinet. Fig. 3 is a plan view of the kitchen cabinet. Fig. 4 is a vertical sectional view, taken substantially on the line 4—4 of Fig. 3. Fig. 5 is a similar view, taken substantially on the line 5—5 of Fig. 3. Fig. 6 is a horizontal sectional view, taken substantially on the line 6—6 of Fig. 2. Fig. 7 is a horizontal sectional view, taken substantially on the line 7—7 of Fig. 2. Fig. 8 is a reverse plan view of the removable sifter. Fig. 9 is a detail vertical sectional view, illustrating the construction of the coffee bin and the arrangement of the coffee mill. Fig. 10 is a detail horizontal sectional view, taken substantially on the line 10—10 of Fig. 9. Fig. 11 is a detail sectional view, illustrating the manner of locking the base of the kitchen cabinet.

Like numerals of reference designate corresponding parts in all the figures of the drawings.

12 designates the base of the kitchen cabinet, which is constructed entirely of metal, and the said base 12, which is substantially rectangular, is provided at the front with a lower extension 13. Within the base is arranged a horizontal partition 14, which forms the top of the extension 13, and the space between the horizontal partition 14 and the top of the base is centrally divided by a vertical partition 15. A vertical partition 16, which is located near one end of the base, divides the space below the horizontal partition 14 into two compartments 17 and 18. The smaller compartment 17 is designed to receive a rolling pin 19, and the other compartment 18 is provided with suitable ways 20 and 21, in which are slidably mounted shallow pans 22, designed for holding knives, forks, and similar articles. The ways 20, which are located at the center of the space or compartment 18, consist of a depending vertical web or portion and a horizontal portion, which projects laterally from the opposite sides of the lower edge of the vertical web or portion to form supporting flanges for the inner sides of the said pans 22. The other ways 21 support the outer sides of the pans 22 and consist of angle strips or pieces, L-shaped in cross section and suitably secured to the partition 16 and to the opposite wall of the space or compartment 18. The space below the shallow pans is adapted to receive a dough board 23, and a cake cutter 24, and various other utensils may be kept in the bottom compartments of the base of the kitchen cabinet. The extended portion of the base of the kitchen cabinet is provided with a suitable door 25, preferably bowed, as shown, and hinged to the front edge of the horizontal partition 14. The side walls of the base at the extension are provided with curved edges to conform to the configuration of the bowed door 25, and suitable supporting flanges 26 are arranged at the inner faces of the bottom and sides of the said extension.

The upper portion of the base above the front extension is provided with horizontally swinging doors 27 and 28, hinged to the side walls of the base and provided at their inner faces with compartments 29 and 30, which are located above the front extension of the base when the doors 27 and 28 are closed. The top portions of the doors 27 and 28 are curved or bowed, and the inner compartments are formed by vertical walls and horizontal bottoms, secured to the inner faces of the doors. The upper edges of the vertical walls are curved to conform to the bowed top portions of the doors. The door 27 is provided a short distance above the bottom with a horizontal plate or piece, having circular openings and forming a rack 31 for the reception of canisters 32, or other receptacles. The canisters are designed to contain spices, and other materials used in the preparation of food. The compartment 30 of the other door 28 is provided with a rack 33, consisting of an angularly bent strip of sheet metal, extending longitudinally of the door and secured to the end walls thereof. The space inclosed by the strip is divided by short transverse pieces 34 into a plurality of small spaces and a larger space, the small spaces being adapted for the reception of bottles 35 of extract and other materials, and the large space being designed to receive a cook book 36.

The central vertical partition 15 is provided at its front with a flange, having a notch 37, which is adapted to be engaged by a hook 38, or other suitable fastening device for securing the door 27 in its closed position. The other door, which has a projecting flange 39 to engage the door 27, is also provided with a lock 40, the bolt of which engages a suitable keeper 41 of the door 27. The doors 27 and 28 project above the base, and when closed operate to lock an upper set of doors 42, 43 and 44.

Mounted upon the base are opposite cylindrical casings 45 and 46, and an intermediate coffee bin 47, arranged in the recess or space at the front of the proximate sides of the cylindrical casings and suitably connected with the adjacent portions of the side casings 45 and 46. Within the casing 45 and the compartment 48, which is located directly beneath the said casing 45, are located independently revoluble supports. The lower support, which is circular, consists of a horizontal disk 49 and a plurality of radially arranged substantially triangular wings 50. The horizontal disk, which has an upwardly extending peripheral flange 51, is provided with a central opening through which passes a vertical bearing tube 52. The tube 52 extends a short distance below the horizontal plate or disk 49, and is fitted in a socket or bearing 53, and the inner vertical edges of the wings 50 are secured to the upwardly extending portion of the tube 52. The tube 52 is mounted on a vertical pivot 54, consisting preferably of a tube and extending from the base to the top portion of the kitchen cabinet. The lower portion of the pivot tube is preferably arranged on a fixed rod or post 55, which is rigidly secured at its lower end in a suitable socket 56 of the lower vertical partition 16 of the base. The upper end of the pivot tube is arranged in an opening 57 of a substantially semi-circular plate 58, which is secured within the upper end of the casing 45 and which forms a hood to partially close the said casing 45. The space or compartment, formed by the wings of the lower rotary support, receives a plurality of cans or receptacles 59, designed to contain such materials as salt, soda, pulverized sugar, baking powder, etc. Any one of the receptacles may be brought to the front by rotating the lower support.

The upper rotary support, which is constructed the same as the lower support, consists of a bottom disk or plate 60 and a plurality of vertically disposed substantially triangular wings 61, secured to the bottom disk or plate and to a vertical tube 62, which extends upward from a central opening of the bottom disk or plate. The upper support receives a plurality of bins or receptacles 63, which are sector-shaped in horizontal section, as clearly illustrated in Fig. 6 of the drawings, and the upper end of the tube 62, which terminates short of the tops of the bins or receptacles, is engaged by hook-shaped lugs 64, carried by and projecting from the bins or receptacles 63. The bins or receptacles are detachably mounted on the upper rotary support and are adapted to be removed therefrom, when desired.

The casing 45 is provided at the bottom with an opening 65, which is covered by the door 42, when the kitchen cabinet is closed, and the bins or receptacles 63 are adapted to be brought to the opening 65 by rotating the upper support. The removable bins or receptacles 63 are designed for containing meal, ordinary sugar, rice, and similar materials, which are used in comparatively large quantities, and each of the bins or compartments is provided with a tapering or funnel-shaped bottom 66, located above the lower edges of the walls of the bins or receptacles and provided with a bottom opening at which is mounted a slide 67. The slide 67 is mounted in suitable guides or ways and is provided with a pair of upwardly projecting agitator fingers 67ᵃ, which are adapted to engage and loosen the material, when the slide is drawn outward. The bin or receptacle is provided below the upper edge of the tapering or funnel shaped bottom 66 with an opening for affording access to the space below the bottom of the bin or receptacle.

The space below the bin or receptacle, is adapted to receive a cup or other receptacle into which a quantity of the material within the bin or receptacle, may be discharged by manipulating the slide. The bins or receptacles are provided with suitable finger-receiving depressions or recesses 68 for convenience in rotating the upper support. The bins or receptacles may be supplied with material without removing them from the kitchen cabinet, a suitable filling opening and cover 69 being provided at the top of each removable bin or receptacle 63.

The casing 46 is divided by a fixed diametrically arranged partition 70 and a radially arranged partition 71 into bins 72 and 73. The bin 72 is preferably semi-circular in cross section, and is designed to contain flour, and the other bins, which are quadrant shaped and one half the size of the bin 72, are designed for the reception of cereal, graham flour, or the like. The upper end of the casing 46 is braced by a horizontally disposed diametrically arranged combined guide and housing 71ª, extending from the front to the back of the casing 46 and located at the upper edge of the radial partition 71. This combined guide and casing receives a slidable scale arm 71ᵇ, which is adapted to be drawn outward for supporting a scale to weigh the material of the cabinet. The arrangement of the combined guide and casing across the upper end of the casing 46 serves to brace the back of the flour bin, and it enables a comparatively long scale arm to be employed, so that the scale and the scale pan, or other receptacle will clear the kitchen cabinet while weighing the material. A long, strong scale arm, which may be easily returned within the combined guide and casing, is provided. The lower portion of the casing 46 is provided with an opening 74, which is covered by the door 43, when the kitchen cabinet is closed and which affords access to the fixed bins or receptacles 73. The fixed bins or receptacles are provided with tapering or funnel shaped bottoms 75, having discharge openings 76, which are controlled by slides 77, mounted in suitable guides and having upwardly extending agitator fingers 77ª to loosen the material. There is sufficient space beneath the slides 77 for a cup, or other receptacle in which the contents of the bin 73 may be discharged.

The bin 72 for the reception of flour is open at the top, and the flour is supported upon a sifter 78, spaced from the lower end of the casing 46 and slidably mounted within the compartment 79 of the base. The compartment 79 is provided with suitable ways to receive the sifter, which consists of a circular sieve or piece of screen material and a rectangular support 80, constructed of sheet metal and having a circular opening to receive the screen material. The support is provided above the screen material with a circular recess for the reception of an oscillatory agitator 81, consisting of a spider having radial arms and provided with inner and outer rings connecting the arms. The agitator is provided with a central depending shaft or stem 82 to which an operating arm 83 is secured by a nut 84. The operating arm 83, which is provided at its outer end with a suitable grip or knob, operates within a guide 85, consisting of a curved wire or rod having upturned terminals, secured to the support and forming stops for limiting the oscillatory movement of the operating handle. The shaft or stem of the agitator is arranged in a suitable perforation of a diametrically arranged bar or piece 91, which strengthens the sifter and relieves the screen material of strain. The sifter is provided with a depending tapering ring 86, which is located beneath the screen material or sieve proper and which extends downwardly and inwardly therefrom for directing the flour into a pan 87. The pan 87 is arranged upon the bottom of the compartment 79. The upper portion of the compartment 79 is closed at its front by a vertical wall 88, consisting of an outwardly bowed central portion and inwardly extending bowed end portions. A ledge 89, consisting of a plate or piece, extends outwardly from the vertical partition 88 to the front of the base, and it is provided with an upturned flange 90. By this construction recesses are provided at the ends of the ledge 89 for holding various articles.

The sifter, which constitutes a bottom for the rear bin of the casing 46, by being mounted within the base is not only readily removable, but may be constructed of greater area than is possible, when it is located within the bin or compartment. By constructing the sifter of greater area than the bottom of the bin, it is adapted to sift all the flour of the bin, and it thereby prevents the formation within the bin of the wall of flour incident to those bins having sifters of less area than the bottom of the bin. This wall of flour must be broken down or shaken down, which operation is usually effected by pounding on the exterior of the bin and by employing a sifter of sufficient area to prevent such wall of flour, the injury resulting from such pounding of the sides of the bin is avoided.

The coffee bin, which is substantially the same length as the side casings 45 and 46, receives a removable coffee mill 92, having an exteriorly arranged handle 93. The lower portion of the coffee bin is cut away to provide an opening 94, which is covered by the door 44, when the kitchen cabinet is employed. The coffee bin is provided at the top of the opening 94 with a recess 94ª, open at the bottom and receiving the projecting portion of the detachable coffee mill 92. The coffee mill 92 is detachably secured within the coffee bin by thumb screws 94ᵇ, which engage suitable threads of the bin and which are easily accessible from the front. The screw threads may be easily provided by soldering, or otherwise securing nuts to the coffee bin, but the coffee mill may be detachably secured within the coffee bin by bolts, or in any other preferred manner. The space beneath the coffee mill receives a cup, or other suitable receptacle 95, which is supported on a partition 96.

The coffee bin is provided at the top with a filling opening, and it has an upwardly extending threaded flange 97, surrounding the filling opening and receiving a screw cap or closure 98. The screw cap or closure is provided with an upwardly extending loop 99, which passes through a hasp member 100, rigidly secured to a cover 101 and projecting over and engaging a similar cover 102. The covers 101 and 102, which fit on the casings 45 and 46, are provided at the sides of the kitchen cabinet with projecting hook-shaped lugs or members 103, which detachably engage loops 104. The hook-shaped lugs or members and the loops form hinges, and at the same time permit the lids or covers 101 and 102 to be detached, when desired. When the hasp member 100 is in engagement with the loop and with the lid or cover 102, the top of the kitchen cabinet may be locked by securing the hasp member to the loop with the shackle of a padlock 105, or other suitable locking device. The padlock by engaging the loop not only secures the lids or covers 101 and 102 in their closed position, but also locks the screw cap or closure of the coffee bin against rotary movement.

The kitchen cabinet is preferably provided with a removable top support or bracket 106, consisting of a vertical portion having a clock-receiving opening and provided at the lower edge with inwardly extending arms 107, which are slidably arranged in openings or eyes of plates 108. The plates or pieces 108, which are grooved or bent to form the eyes or openings for the arms of the clock-receiving bracket or support, are soldered, or otherwise secured to the coffee bin.

Having thus fully described our invention, what we claim as new and desire to secure by Letters Patent, is:—

1. A kitchen cabinet comprising a base having compartments, superimposed bins provided with doors arranged contiguous to the base, doors mounted on the base for closing the compartments thereof and projecting beyond the base and engaging the doors of the bins for locking the same in their closed position, and means for locking the doors of the base.

2. A kitchen cabinet comprising a base provided with compartments and having a hinged door, a superimposed bin mounted on the base and provided adjacent to the said hinged door, with a hinged door, one of the said doors being provided with an extended portion overlapping and engaging the other of the said doors, and means for locking the door having the said extended portion.

3. A kitchen cabinet comprising a base, a superimposed casing, independently revoluble upper and lower supports mounted within the casing and the base, and removable receptacles carried by the supports.

4. A kitchen cabinet comprising a base, a superimposed casing, a continuous support extending into the base and into the casing, upper and lower independently revoluble supports located within the casing and the base, and receptacles carried by the supports.

5. A kitchen cabinet having a pivot and provided with a rotary support comprising a bottom having a central opening, a tube extending upward from the bottom at the central opening thereof and receiving the pivot, and radially arranged wings secured to the bottom portion and the tube.

6. A kitchen cabinet provided with a pivot, a rotary support having a tube arranged on the pivot, and a plurality of removable receptacles arranged on the support and having means for detachably engaging the tube.

7. A kitchen cabinet provided with a pivot, a rotary support having a tube arranged on the pivot, and a plurality of removable receptacles arranged on the support and having substantially hook-shaped lugs engaging the upper end of the tube.

8. A kitchen cabinet comprising a base, a superimposed casing having a hood at the top, a pivot extending into the base and into the casing and connected at its upper end to the hood, and upper and lower rotary supports mounted on the pivot and movable independently of each other.

9. A kitchen cabinet comprising a base, a superimposed casing provided at the lower portion with a door, a rotary support mounted within the casing, a plurality of removable sector-shaped bins arranged on the support, and means carried by the support and having an interlocking connection with the bins for retaining the latter on the support.

10. A kitchen cabinet comprising a base provided with a fixed pivot, a superimposed casing, a tubular pivot fitted on the fixed pivot of the casing and extending to the upper portion of the casing, means located at the upper end of the pivot for connecting the same with the casing, and upper and lower rotary supports arranged on the tubular pivot.

11. A kitchen cabinet provided with a casing having an opening at the bottom, a rotary support, and a plurality of substantially sector-shaped bins detachably arranged on the support, each of the said bins being provided near its lower end with a tapering or funnel shaped bottom and extended below the bottom to provide a supporting portion, the latter having an opening located beneath the bottom, the said tapering bottom being also provided with a discharge opening and having a closure for the same.

12. A kitchen cabinet comprising a base, superimposed casings supported by the base, a coffee bin arranged between and connecting the said casings and also arranged upon and supported by the base and provided with a bottom opening, and a coffee mill detachably mounted within the coffee bin at a point above the opening and having exteriorly arranged operating means.

13. A kitchen comprising spaced casings, a bin arranged between the casings and having a screw cap, covers for the casings, and a locking device mounted on one of the covers and on the screw closure and engaging the other cover.

14. A kitchen cabinet comprising casings, a bin arranged between the casings and having a screw closure provided with a projecting member, covers mounted on the casings, one of the covers being provided with a hasp member having an opening receiving the projecting member, said hasp member being also of a length to engage the other cover, and locking means for securing the hasp member to the projecting member.

15. A kitchen cabinet provided with casings, a bin arranged between the casings and having a screw closure provided with a projecting loop, covers for the casings, and a hasp member mounted on one of the covers and engaging the other and provided with an opening to receive the loop of the closure, said hasp member being adapted to be secured to the loop by a lock.

16. A kitchen cabinet comprising a pair of casings, a bin arranged between the casings and having a screw closure provided with a projecting member, covers detachably interlocked with the casings at the outer sides thereof, and a hasp member rigid with one of the covers and arranged at the inner side thereof and engaging the other cover, said hasp member being provided at an intermediate point with an opening receiving the projecting member of the screw closure.

17. A kitchen cabinet comprising a base, a superimposed casing mounted on the base and provided with radial partitions dividing the casing into a plurality of bins or compartments, one of the bins or compartments being extended below the others and communicating with the interior of the base, and a sifter mounted within the base beneath such compartments.

18. A kitchen cabinet comprising a base, a superimposed casing having a front opening at the lower portion above the base and provided with radial partitions dividing the casing into front and rear bins or compartments, the rear bin or compartment communicating with the base and the front bins or compartments being terminated short of the lower end of the base casing and having means located at the said front opening for discharging their contents, and a sifter mounted within the base and forming a bottom for the rear compartment.

19. A kitchen cabinet comprising a base provided with ways extending rearwardly from the front of the base, a superimposed bin communicating with the base, and a sifter slidable in the ways and removable at the front of the kitchen cabinet and forming a bottom for the said bin.

20. A kitchen cabinet comprising a base, a superimposed bin, a sifter located beneath the bin and mounted within the base at the point between the top and bottom thereof, a vertical wall arranged at the front of the base and located above the sifter between the same and the said bin, said wall having inwardly extending portions, and a ledge located at the said inwardly extending portions and provided with an upwardly extending flange.

21. A kitchen cabinet comprising a base provided with ways extending rearwardly from the front of the cabinet, a bin or receptacle supported by the base, and a sifter slidable in the ways and located beneath the lower end of the bin or receptacle and having an area equal to the bottom of the same, whereby the flour is completely sifted at the bottom of the bin or receptacle to prevent a wall of flour from collecting around the sifter.

22. A kitchen cabinet comprising a casing, a guide extending across the casing at an intermediate point between the sides thereof and forming a brace for the same, a partition connected with the guide and a scale supporting arm slidable in the said guide and arranged to project from the casing.

23. A kitchen cabinet comprising a casing, diametrically and radially arranged partitions disposed within the casing and dividing the same into separate bins or compartments, a diametrically arranged guide located at the upper edge of the radially arranged partition and extending across the casing, and a scale supporting arm slidable in the guide.

24. A kitchen cabinet comprising a coffee bin cut away at the bottom and provided at the top of the cut away portion with a recess open at the bottom, a removable coffee mill arranged within the coffee bin and having an exteriorly arranged handle located at the said recess and the shaft to which the handle is connected being extended through the said recess, and fastening means operable from the front of the kitchen cabinet for detachably securing the coffee mill within the coffee bin.

In testimony, that we claim the foregoing as our own, we have hereto affixed our signatures in the presence of two witnesses.

JAMES H. COUPER.
WILLIAM L. ALBRIGHT.

Witnesses for Couper:
  R. A. COHEN,
  ALPHONSE HUETEL.

Witnesses for Albright:
  JENNIE THOMPSON,
  J. D. DE WITT.